Oct. 16, 1956     A. W. DASCHKE     2,767,377
COMPENSATED ELECTRICAL RECTIFIER AND METER
Filed June 7, 1952
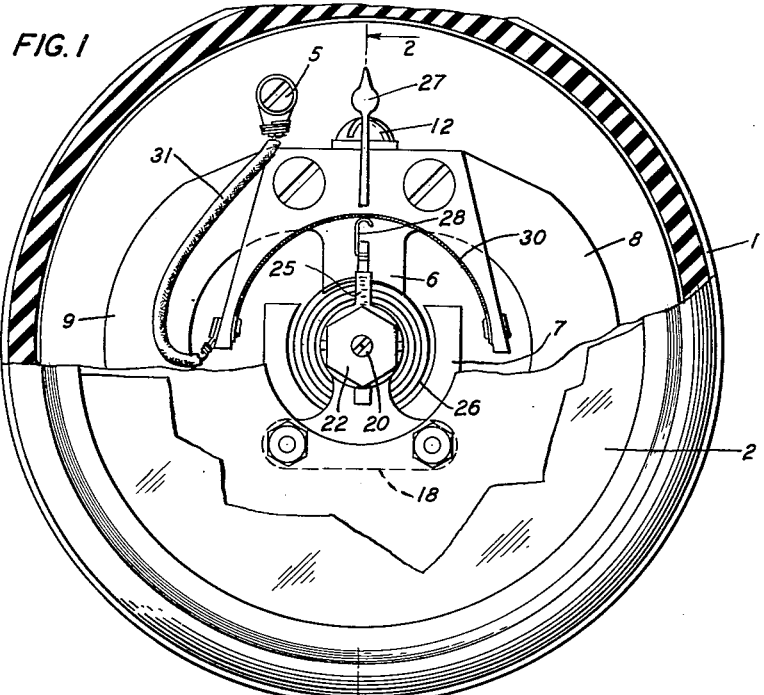
FIG. I
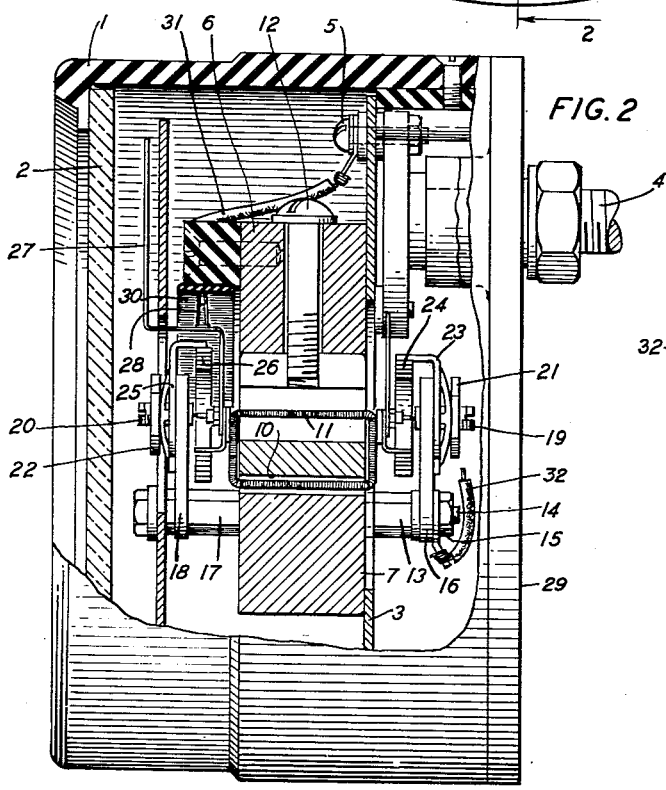
FIG. 2
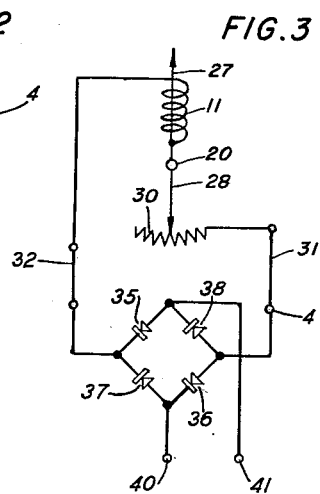
FIG. 3
INVENTOR
A. W. DASCHKE
BY *W. R. Dawson*
ATTORNEY

United States Patent Office 2,767,377
Patented Oct. 16, 1956

2,767,377

COMPENSATED ELECTRICAL RECTIFIER AND METER

Arthur W. Daschke, Morristown, N. J., assignor to Bell Telephone Laboratories Incorporated, New York, N. Y., a corporation of New York Application June 7, 1952, Serial No. 292,353

3 Claims. (Cl. 324—119)

This invention relates to alternating-current meters for use in circuits of relatively low impedance.

The object of the invention is means to compensate for the variations in the impedances of the rectifier elements forming part of the metering combination.

A feature of the invention is a resistor connected in serial relationship with the meter and varied by the meter movement to compensate for the variations in the impedances of the rectifier elements.

Alternating-current meters commonly comprise a direct-current meter of the d'Arsonval type connected to a rectifying network including one, or more, rectifier elements. The rectifier elements are asymmetrically conductive devices, such as thermionic diodes, or semiconductors, such as copper-copper oxide couples. These elements usually have a substantially exponential variation of impedance with the amplitude of the current flowing in the element. Thus, the impedance of the combination of meter and network varies with the amplitude of the voltage or current being measured. In accordance with the present invention, a resistor is connected in serial relationship with the meter, and is varied in resistance by the current being measured to compensate for the variations in impedance of the network.

In the drawings:

Fig. 1 shows a top view, in part section, of a meter embodying the invention;

Fig. 2 shows a side view, in part section, of the meter shown in Fig. 1; and

Fig. 3 shows in schematic form the complete metering combination.

Figs. 1 and 2 disclose a conventional direct-current meter, of the d'Arsonval type. While, for convenience of description, a specific type of meter has been disclosed, the invention is not limited thereto, but may be embodied in many other types of meters.

The case 1, which may be of metal, or some insulating material, mounts the cover glass 2. A mounting plate 3 is secured to the enlarged base of the mounting stud 4 as by screw 5, but is insulated therefrom. Normally, two or more, studs 4 are used, but only one has been shown. The pole-pieces 6, 7 are secured to the mounting plate 3 in any suitable manner, as by screws, not shown. The magnets 8, 9 are pressed against the sides of the pole-pieces 6, 7 and retained in position by magnetic attraction. A cylinder 10, of magnetic material, slotted longitudinally to admit the coil 11, is secured by screw 12 in contact with pole-piece 6, and forms with pole-piece 7, an annular gap in which the coil 11 can move. A spacer 13 secured to the pole-piece 7, supports a plate 16, which is secured to spacer 13 by screw 14 and nut 15, but insulated therefrom. A similar spacer 17, secured to pole-piece 7, supports the plate 18. The coil 11 is rotatably supported in jewelled bearings mounted in the screws 19, 20, screwed through the plates 16, 18, and retained by lock-nuts 21, 22.

The case 1 is completed by a rear cover plate 29, which may be secured to the case 1 by screws, or by nuts on the studs 4.

A washer 23, supported by the plate 16, is attached to a hairspring 24, which is connected to the winding of coil 11, and is secured to the former of coil 11, but insulated therefrom. Similarly, a washer 25, supported by the plate 18, is attached to hairspring 26, which is connected to the winding of coil 11, pointer 27, and brush 28, and is secured to the former of coil 11, but insulated therefrom.

The resistor 30 may be made of resistive material shaped to produce the desired variation of resistance, or of an insulating card, properly shaped and evenly wound with enameled wire, which is suitably prepared to make a good electrical contact with the brush 28. One end of resistor 30 is connected by wire 31 and screw 5 to the stud 4. The coil 11 is connected by wire 32 to the other stud, not shown. Thus, current can flow from the other stud, wire 32, plate 16, washer 23, hairspring 24, coil 11, pointer 27, brush 28, winding 30, wire 31, screw 5, to stud 4.

As shown in Fig. 3, the meter is connected to a rectifier network, formed of the rectifier elements 35, 36, 37, 38, and the combination may be connected by terminals 40, 41 to the circuit to be tested.

The invention has particular utility in connection with low current, and low voltage meters. Meters designed to measure higher voltages are usually connected in series with a high resistance, and this resistance is often so large that the variations in the impedances of the varistors are a small fraction of the total resistance, and, thus, may not be of interest.

The invention may conveniently be described as embodied in a db meter for audio frequency level measurements in communication circuits, where it is desired that the meter presents a constant impedance in the circuit. The meter movement is actuated by currents up to 500 microamperes full scale, and is associated with a double wave, bridge connected network of varistor elements of the copper-copper oxide type.

The variation in terminal resistance of this typical meter combination, and the values of the corrective resistor are tabulated below for 1.5 and 3-volt ranges. The meter coil has a resistance of 340 ohms; and the varistor resistance is the effective resistance of the complete network.

| Microamperes | Varistor Resistance | Terminal Resistance | Corrective Resistance | |
|---|---|---|---|---|
| | | | 1.5-Volt Range | 3-Volt Range |
| 50 | 2,600 | 2,940 | 60 | 3,060 |
| 100 | 1,650 | 1,990 | 1,010 | 4,010 |
| 150 | 1,280 | 1,620 | 1,380 | 4,380 |
| 200 | 1,040 | 1,380 | 1,620 | 4,620 |
| 250 | 900 | 1,240 | 1,760 | 4,760 |
| 300 | 800 | 1,140 | 1,860 | 4,860 |
| 350 | 725 | 1,065 | 1,935 | 4,935 |
| 400 | 670 | 1,010 | 1,990 | 4,990 |
| 450 | 620 | 960 | 2,040 | 5,040 |
| 500 | 575 | 915 | 2,085 | 5,085 |

The fourth column of values of the corrective resistance will produce a voltmeter having a range of 1.5 volts, and a resistance of 2000 ohms per volt. The last column gives the values of the corrective resistance for a similar voltmeter having a range of 3.0 volts and a resistance of 2000 ohms per volt. It is evident that the added, constant 3000-ohm resistance has materially reduced the necessary range of variation of the corrective resistor.

What is claimed is:

1. Apparatus for measuring alternating currents comprising a rectifying network having an impedance varying with the rectified current and adapted to be connected to a source of current to be measured, a meter, and a resistor connected in series with said meter to said network and adjusted by said meter to compensate for the variation in impedance of said network.

2. Apparatus for measuring alternating currents comprising a bridge network of asymmetrically conductive elements having impedances varying with the amplitude of the rectified current and adapted to be connected to a source of current to be measured, a meter, and a resistor connected in series with said meter to said network and adjusted by said meter to compensate for the variations in impedance of said elements.

3. Apparatus for measuring alternating currents comprising a bridge network of copper-copper oxide couples, a direct-current meter, and a resistor connected in series with said meter to said network and adjusted by said meter, said resistor having a resistance tapered in magnitude to compensate for the variation in impedance of said network.

References Cited in the file of this patent

UNITED STATES PATENTS

| | | |
|---|---|---|
| 1,753,921 | Edelman | Apr. 8, 1930 |
| 2,189,660 | Boudreau | Feb. 6, 1940 |
| 2,290,559 | Hitchcock et al. | July 21, 1942 |

FOREIGN PATENTS

| | | |
|---|---|---|
| 211,971 | Switzerland | Jan. 16, 1941 |